United States Patent
Rippon (10) Patent No.: US 11,309,975 B2
(45) Date of Patent: Apr. 19, 2022

(54) FIBER-OPTICALLY POWERED ANTENNA

(71) Applicant: Schweitzer Engineering Laboratories, Inc., Pullman, WA (US)

(72) Inventor: Daniel B. Rippon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/785,920

(22) Filed: Feb. 10, 2020

(65) Prior Publication Data
US 2021/0250103 A1 Aug. 12, 2021

(51) Int. Cl.
| | | |
|---|---|---|
| H04B 10/80 | (2013.01) |
| G02B 6/42 | (2006.01) |
| G02B 6/43 | (2006.01) |
| H04B 10/118 | (2013.01) |
| G06F 1/10 | (2006.01) |
| H04L 7/00 | (2006.01) |
| H04B 10/2575 | (2013.01) |

(52) U.S. Cl.
CPC ......... *H04B 10/807* (2013.01); *G02B 6/4279* (2013.01); *G02B 6/43* (2013.01); *G06F 1/105* (2013.01); *H04B 10/118* (2013.01); *H04B 10/2575* (2013.01); *H04L 7/0075* (2013.01)

(58) Field of Classification Search
CPC .. H04B 10/2575–25759; H04B 10/807; G06F 1/105; H04L 7/0075
See application file for complete search history.

(56) References Cited

U.S. PATENT DOCUMENTS

| | | | |
|---|---|---|---|
| 5,905,758 A | 5/1999 | Schweitzer | |
| 6,188,494 B1 | 2/2001 | Minteer | |
| 7,941,022 B1* | 5/2011 | Schaffner | G02B 6/03633 385/127 |
| 10,659,168 B2 | 5/2020 | Rector | |
| 2014/0270788 A1* | 9/2014 | Blauvelt | H01S 5/026 398/116 |
| 2014/0334824 A1* | 11/2014 | Goldner | H04B 10/25754 398/116 |
| 2016/0341921 A1* | 11/2016 | Belansky | H04B 10/807 |
| 2017/0302392 A1* | 10/2017 | Farra | H04J 14/021 |
| 2021/0036785 A1* | 2/2021 | Sugime | H04B 10/691 |

OTHER PUBLICATIONS

Thor Broadcast, "GPS Over Fiber—Reference Timing Fiber Optic Waterproof Solution", F-GPS-TX-WE / F-GPS-TX-RM, retrieved from: https://thorbroadcast.com/product/gps-over-fiber-reference-timing-fiber-optic-waterproof-solution.html#specification. Accessed Aug. 18, 2020.
Optical Zonu, "GPS Fiber Transport" 2014. V 5.5 140716, Optical Zonu Corp. 2014.

(Continued)

*Primary Examiner* — Casey L Kretzer
(74) *Attorney, Agent, or Firm* — Fletcher Yoder, P.C.; Bradley W. Schield (57) ABSTRACT

An optically powered Global Navigation Satellite System (GNSS) antenna may use a fiber-optic link to receive optical power and transmit an optical signal that contains a common time signal from one or more satellites, which may allow long-distance power and signal transmission with high efficiency and reliability. The common time signal may be used to synchronize intelligent electronic devices (IEDs) of an electric power delivery system.

23 Claims, 3 Drawing Sheets

(56) References Cited

OTHER PUBLICATIONS

GPS Networking, "FOGPSAL Fiber Optic GPS Antenna Link Technical Product Data" Datasheet. Jul. 2007. retrieved from: https://www.gpsnetworking.com/products/fogpsal-rm on Aug. 21, 2020.

Broadcom® "AFBR-POCxxxL Optical Power Converter" Data Sheet, Oct. 2019, retrieved from: https://www.broadcom.com/products/fiber-optic-modules-components/industrial/optical-power-components/optical-power-converters/afbr-poc204l on Aug. 21, 2020.

* cited by examiner

FIBER-OPTICALLY POWERED ANTENNA

BACKGROUND

This disclosure relates to an optically powered antenna system that can operate using energy from an optical power signal provided over a fiber-optic link.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electrical power transmission and distribution systems use precise timing for grid monitoring and situational awareness, to coordinate the operation and integration of a variety of grid assets, and for grid protection and operation. Because power distribution systems are so large and often geographically separated, intelligent electronic devices (IEDs) used in these systems often share a common time source from a satellite navigation system (e.g., a global navigation satellite system (GNSS), global positioning system (GPS)). The resulting timestamped data can be used for real-time situational awareness and operator decision support, generator model validation, and forensic event analysis, among other things.

In practice, GNSS satellites broadcast accurate and stable time signals from their on-board atomic clocks to Earth. A GNSS antenna on Earth may acquire a time signal from satellites of a GNSS and pass it to an IED via a coaxial cable. Coaxial cables, however, can create a path for electrical surges (such as electrical transients or lightning) that could result in damage. Moreover, while coaxial cables are inexpensive and effective for short cable lengths, they may not be cost effective at lengths longer than 500 feet, limiting the possible placement of GNSS antennas and/or IEDs that rely on a GNSS time signal.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One example includes a system for obtaining a common time signal from a global navigation satellite system (GNSS) for synchronizing intelligent electronic devices (IEDs) of an electric power delivery system. The system may include an optically powered antenna device, an optical power transmitter, and an optical receiver. The optically powered antenna device may receive the common time signal over radio frequency (RF) from one or more satellites and output the common time signal as an optical signal. The optical power transmitter may provide an optical power signal to power the optically powered antenna device. The optical signal receiver may receive and decode the optical signal from the optically powered antenna device to obtain the common time signal.

In another example, an optically powered antenna device includes an optical receiver that converts an optical power signal into electric power, an antenna element that receive a radio frequency (RF) signal, and an optical signal transmitter that receives the RF signal and uses the electric power to output the RF signal in an optical signal.

In another example, circuitry for obtaining a common time signal for synchronizing intelligent electronic devices (IEDs) of an electric power delivery system includes an optical power transmitter and an optical signal receiver. The optical power transmitter may generate an optical power signal to power an optically powered antenna device, and the optical signal receiver may detect an optical signal that contains the common time signal from the optically powered antenna device.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, for the sake of brevity and clarity, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein may be arranged and designed in a wide variety of different configurations.

As mentioned above, an electric power delivery system may generate, transmit, and/or distribute electric energy to loads. The electric power delivery system includes electric generators, power transformers, power lines, circuit breakers, busses, regulators, capacitors, and loads, etc. The electric power delivery system may be monitored, controlled, automated, and/or protected using intelligent electronic devices (IEDs). To enable the integration of diverse data types and sources and assure that decentralized, parallelized analysis and control actions are effectively coordinated and implemented, a common time signal may be distributed to the IEDs of the electric power delivery system. Using a common, accurate time source may ensure that the IEDs have a synchronized time signal that can be used to generate time-synchronized data.

On example of a common time source is a satellite navigation system, which may be global or regional, often referred to as a global navigation satellite system (GNSS). The US Global Positioning System (GPS) is one example of a GNSS. Other examples include GLONASS (Russia), Galileo (European Union), BeiDou (China), QZSS (Japan), and IRNSS (also sometimes called NavIC) (India). GNSS satellites often broadcast accurate and stable time signals from their on-board atomic clocks to Earth. A GNSS antenna on Earth may acquire time signals from GNSS satellites and pass them to intermediary GNSS clocks. For example, the intermediary GNSS clocks may include satellite-synchronized network clocks, which receive GNSS time signals from the antenna, obtain the Position, Velocity and Time (PVT) solution, synchronize to the GNSS time, and distribute precise time to various IEDs of the electric power delivery system via one or more output protocols. These output protocols may include the TRIG-B, the Precision Time Protocol (PTP), the Network Time Protocol (NTP), or the like. When many IEDs across the electric power delivery system receive the GNSS time, the IEDs may become time-synchronized to the same GNSS time, even when the IEDs are quite remote from one another.

It has been discovered that the challenges of powering a GNSS antenna and receiving GNSS signals from the GNSS antenna using an electrically conductive cable (e.g., a coaxial cable) may be overcome using an optical cable. Indeed, optical cabling may carry energy in the form of photons over a vast distance. Thus, optical cabling may send enough photons of high enough energy to power the GNSS antenna. The photons sent over the optical cabling to the GNSS antenna may be received by the GNSS antenna and converted into electrical energy for use by the GNSS antenna to receive and transmit the GNSS time signal to an IED. Indeed, the optical cabling may even be used to carry a GNSS time signal back to an IED.

Figure 1:
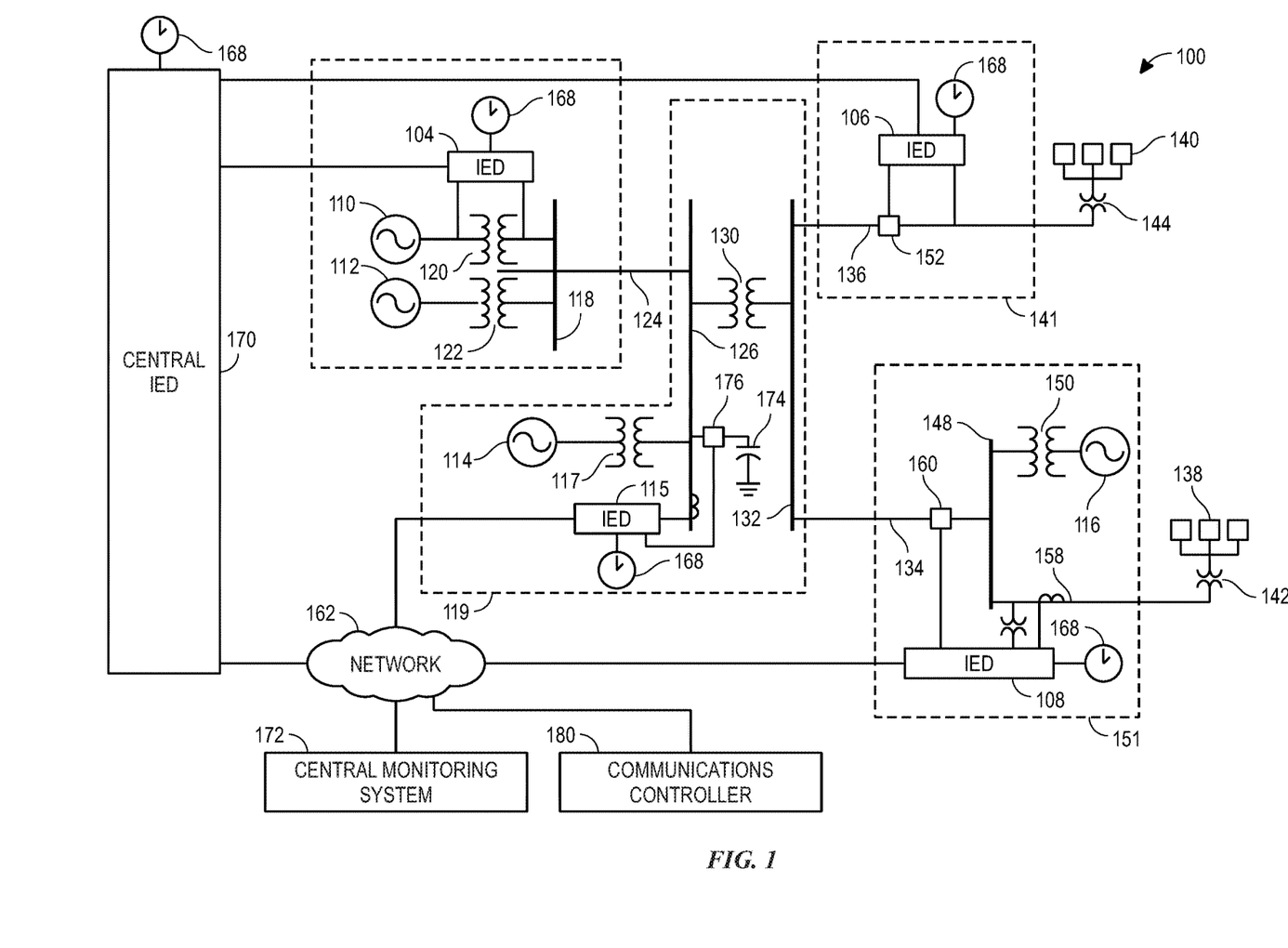
FIG. 1 is a simplified diagram of an embodiment of an electric power delivery system, in accordance with an embodiment.

Turning now to the figures, FIG. 1 illustrates a simplified diagram of an embodiment of an electric power delivery system 100, in which communication devices may facilitate communication in a network to support a central monitoring system 172. For example, the electric power delivery system 100 may generate, transmit, and/or distribute electric energy to loads. As illustrated, the electric power delivery system 100 includes electric generators 110, 112, 114, and 116. The electric power delivery system 100 may also include power transformers 117, 120, 122, 130, 142, 144 and 150. Furthermore, the electric power delivery system 100 may include lines 124, 134, and 158 to transmit and/or deliver power, circuit breakers 152, 160, and 176 to control flow of power in the electric power delivery system 100, busses 118, 126, 132, and 148, and/or loads 138 and 140 to receive the power in and/or from the electric power delivery system 100. A variety of other types of equipment may also be included in electric power delivery system 100, such as voltage regulators, capacitors (such as capacitor 174) and/or capacitor banks, and suitable other types of equipment useful in power generation, transmission, and/or distribution.

A substation 119 may include the electric generator 114, which may be a distributed generator, and which may be connected to the bus 126 through the power step-up transformer 117. The bus 126 may be connected to a distribution bus 132 via the power step-down transformer 130. Various distribution lines 136 and 134 may be connected to the distribution bus 132. The distribution line 136 may lead to a substation 141 where the distribution line 136 is monitored and/or controlled using an IED 106, which may selectively open and close circuit breaker 152. A load 140 may be fed from distribution line 136. The power transformer 144, in communication with the distribution bus 132 via distribution line 136, may be used to step down a voltage for consumption by the load 140.

A distribution line 134 may deliver electric power to a bus 148 of the substation 151. The bus 148 may also receive electric power from a distributed generator 116 via transformer 150. The distribution line 158 may deliver electric power from the bus 148 to a load 138, and may include the power step-down transformer 142. A circuit breaker 160 may be used to selectively connect the bus 148 to the distribution line 134. The TED 108 may be used to monitor and/or control the circuit breaker 160 as well as the distribution line 158.

The electric power delivery system 100 may be monitored, controlled, automated, and/or protected using IEDs such as the IEDs 104, 106, 108, 115, and 170, and the central monitoring system 172. In general, the IEDs in an electric power generation and transmission system may be used for protection, control, automation, and/or monitoring of equipment in the system. For example, the IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other suitable types of monitored equipment.

As used herein, an IED (such as the IEDs 104, 106, 108, 115, and 170) may refer to any processing-based device that monitors, controls, automates, and/or protects monitored equipment within the electric power delivery system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system including multiple IEDs.

Clock circuitry 168 that provides a common time signal may be distributed throughout the electric power delivery system 100. The clock circuitry 168 may receive the common time signal from a common time source, such as from a Global Navigation Satellite System ("GNSS"), or the like. Using the common time signal may ensure that IEDs are able to provide synchronized operation that can be used to generate time-synchronized data, such as synchrophasors. For example, the IEDs 104, 106, 108, 115, and 170 may receive a common time signal from various clock circuitry 168. In some implementations of the system 100, distinct non-common time signals may also be used, but timing differences from these distinct time signals may be compensated for when establishing a baseline or identifying anomalies.

The central monitoring system 172 may include one or more of a variety of types of systems. For example, the central monitoring system 172 may include a supervisory control and data acquisition (SCADA) system and/or a wide area control and situational awareness (WACSA) system. A central IED 170 may be in communication with IEDs 104, 106, 108, and 115 IEDs 104, 106, 108 and 115 may be remote from the central IED 170, and may communicate over various media such as a direct communication from IED 106 or over a communications network 162. According to various embodiments, some IEDs may be in direct communication with other IEDs. For example, the IED 104 may be in direct communication with the central IED 170. Additionally or alternatively, some IEDs may be in communication via the communications network 162. For example, the IED 108 may be in communication with the central IED 170 via the communications network 162.

Communication via the communications network 162 may be facilitated by networking devices including, but not limited to, multiplexers, routers, hubs, gateways, firewalls, and/or switches. In some embodiments, the IEDs and the network devices may include physically distinct devices. In certain embodiments, the IEDs and/or the network devices may be composite devices that may be configured in a variety of ways to perform overlapping functions. The IEDs and the network devices may include multi-function hardware (e.g., processors, computer-readable storage media, communications interfaces, etc.) that may be used to perform a variety of tasks that pertain to network communications and/or to operation of equipment within the electrical power delivery system 100.

A communications controller 180 may interface with equipment in the communications network 162 to create a software-defined network (SDN) that facilitates communication between the IEDs 170, 115, and, 108 and the central monitoring system 172. In various embodiments, the communications controller 180 may interface with a control plane (not shown) in the communications network 162. Using the control plane, the communications controller 180 may direct the flow of data within the communications network 162.

The communications controller 180 may receive information from multiple devices in the communications network 162 regarding transmission of data. In embodiments in which the communications network 162 includes fiber optic communication links, the data collected by the communications controller 180 may include reflection characteristics, attenuation characteristics, signal-to-noise ratio characteristics, harmonic characteristics, packet loss statics, and the like. In embodiments in which the communications network 162 includes electrical communication links, the data collected by the communications controller 180 may include voltage measurements, signal-to-noise ratio characteristics, packet loss statics, and the like. In some embodiments, the communications network 162 may include both electrical and optical transmission media. The information collected by the communications controller 180 may be used to assess a likelihood of a failure, to generate information about precursors to a failure, and to identify a root cause of a failure. The communications controller 180 may associate information regarding a status of various communication devices and communication links to assess a likelihood of a failure. Such associations may be used to generate information about the precursors to a failure and/or to identify root cause(s) of a failure consistent with embodiments of the present disclosure.

As noted above, clock circuitry 168 may supply a common time signal to various IEDs, even when the IEDs are quite remote from one another, by receiving the common time signal from one or more GNSS satellites via a GNSS antenna. In one example, shown in FIG. 2, a GNSS antenna system 200 may supply clock circuitry 168 in an installation 202 with the common time signal. A GNSS antenna device 204 installed on a tower 206 may receive the common time signal from one or more GNSS satellites. The GNSS antenna device 204 may include circuitry powered by an electrical signal provided from the installation 202 over a coaxial cable 208. The coaxial cable 208 may also be used to transmit the common time signal back to the clock circuitry 168 in the installation 202. The clock circuitry 168 may provide the common time signal to the IED 170. Because clock circuitry 168 in the installation 202 may have a ground $G_C$ that is common to a ground $G_A$ of the GNSS antenna device 204 (e.g., the earth), a current loop could form between the clock circuitry 168 and the GNSS antenna device 204 via the conductive members of the coaxial cable 208 through a ground resistance $R_G$. This could create a path for electrical surges 210 (such as electrical transients or lightning traveling to earth 212) that could damage the GNSS antenna device 204, the clock circuitry 168, and/or the IED 170. Furthermore, the coaxial cable 208 may limit the distance (e.g., about 500 feet) that the GNSS antenna device 204 may be placed from the installation 202. This may be due to RF losses that occur with many types of coaxial cabling.

Figure 3:
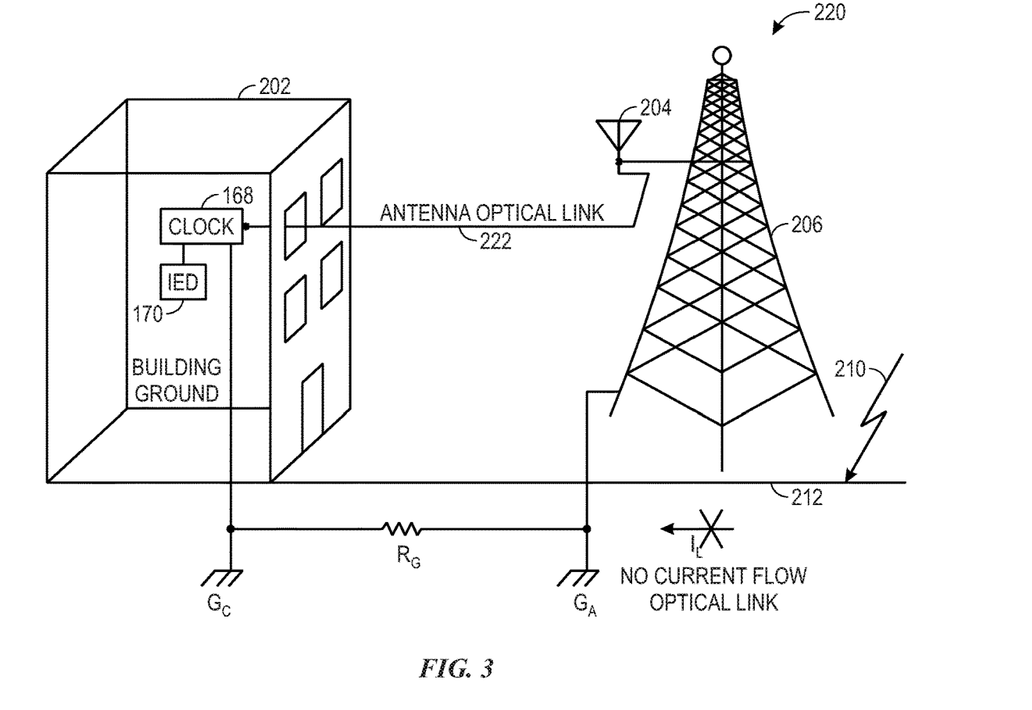
FIG. 3 is a schematic diagram illustrating an optically powered GNSS antenna installation, in accordance with an embodiment.

An optically powered GNSS antenna installation 220 with fiber-optic cabling is illustrated in FIG. 3. In the example of FIG. 3, the GNSS antenna device 204 is powered by photons sent in an optical power signal conveyed by an optical link 222. The optical link 222 may include any suitable fiber-optic cable(s) and optical coupling devices or, in some examples, may be a line-of-sight optical connection through the air. The optical link 222 carries an optical power signal that contains the energy used by the GNSS antenna device 204, which may be installed in a remote site where electrical power may not be available. In addition to providing sufficient power to operate the GNSS antenna device 204, the optical link 222 also conveys as an optical signal the satellite time signal acquired by the GNSS antenna device 204 to the clock circuitry 168. Its low attenuation characteristics, high bandwidth capabilities, and cost efficiency (particularly over a long distance) make the fiber-optic cable an excellent carrier of both energy and the common time signal. Moreover, the optical link 222 may be largely free of electrical conductors, reducing or eliminating a ground loop and thereby reducing exposure to potentially destructive electrical transients. Additionally, with its low attenuation over a long distance, a fiber-optic link may provide a more reliable signal than other cables, including coaxial cables. For example, optical attenuation at 1310 nm in a single-mode optical fiber is around 0.04 dB/100 meters, in comparison to 17 dB/100 meters for an LMR-400 coaxial cable. The optical link 222 may use fiber-optic cable lengths up to several kilometers allow customers to place GNSS antennas far away from an installation 202 based on the circumstances (e.g., which may be particularly beneficial at certain industrial sites, such as a dam or an oil field).

Figure 2:
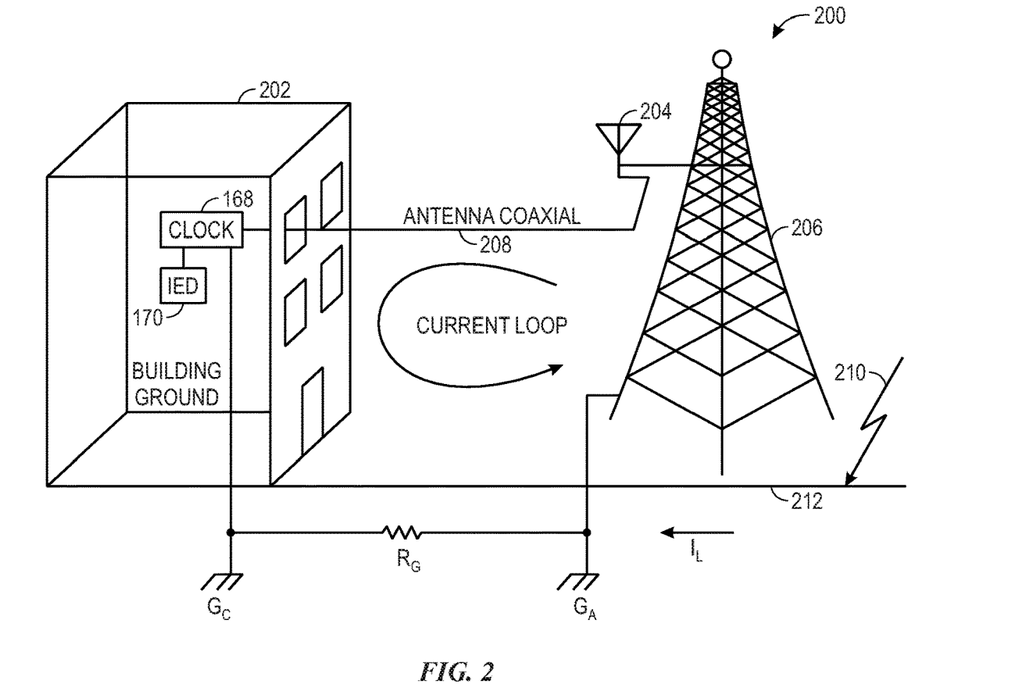
FIG. 2 is a schematic diagram illustrating a GNSS antenna installation with coaxial cabling, in accordance with an embodiment.

It should be noted that, while the tower 206 depicted in example of FIG. 2 or FIG. 3 is separated from the installation 202, in some embodiments, the tower 206 may be mounted on the same operational site (e.g., building) where the installation 202 is located.

Figure 4:
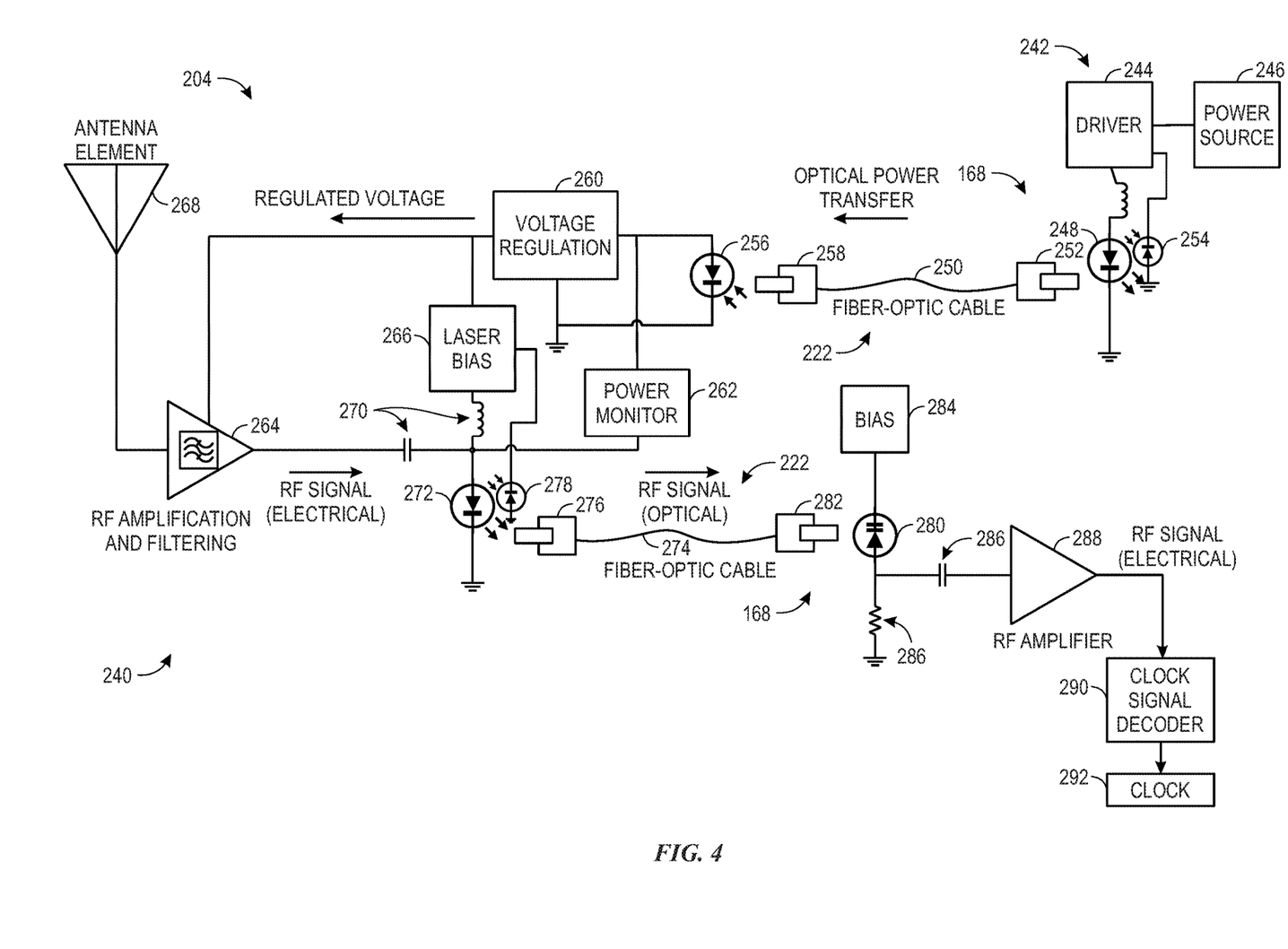
FIG. 4 is a block diagram of an optically powered GNSS antenna system, in accordance with an embodiment.

FIG. 4 illustrates a block diagram of an optically powered GNSS antenna system 240. The optically powered GNSS antenna system 240 includes the GNSS antenna device 204 and the clock circuitry 168 joined by the optical link 222. The clock circuitry 168 may include optoelectronic devices (such as optical power driver, optical to RF converter, and other relevant optical/electronical elements), a clock signal decoder 290, and a clock 292. In some embodiments, the clock signal decoder 290 and the clock 292 may be integrated into a separate clock device connected to the clock circuitry 168. In certain embodiments, the clock circuitry 168 may be integrated into the separate clock device containing the clock signal decoder 290 and the clock 292. In the example of FIG. 4, the optical link 222 includes multiple fiber-optic cables, but it should be appreciated that some examples may use a single optical cable or may use more optical cables than shown. Each fiber-optic cable in the optical link 222 may include one or more optical fibers.

The clock circuitry 168 provides optical power to the GNSS antenna 240 using an optical power driver 242. The optical power driver 242 may include driver circuitry 244 that receives electricity from any suitable power source 246 (e.g., the power grid). The driver circuitry 244 may drive an optical power transmitter 248 with the electricity to cause photons (e.g., light) to be emitted in relation to the amount of electricity provided by the driver circuitry 244. The emitted photons enter a fiber-optic cable 250 of the optical link 222 through an optical coupler 252 to provide optical energy to power the GNSS antenna device 204. The driver circuitry 244 may be regulated by a feedback signal from a photodetector 254. The photodetector 254 may sample the photons emitted by the optical power transmitter 248 to generate an electrical feedback signal that is proportional to the number of photons detected by the photodetector 254. In this way, the driver circuitry 244 may regulate the amount of electricity that is sent to the optical power transmitter 248 and, thus, the amount of optical energy transmitted to the GNSS antenna device 204. Additionally or alternatively, the current through the optical power transmitter 248 may be used as the feedback signal to the driver circuitry 244.

To this end, the optical power transmitter 248 may be any suitable light-producing device. For example, the optical power transmitter 248 may be a laser device or a light-emitting diode (LED), depending on the power and wavelength (or wavelength range) needed. If a laser device, the optical power transmitter 248 may incorporate any suitable type of laser (e.g., conventional or semiconductor laser) that can provide sufficient power in a suitable wavelength range to ensure long-distance power transfer via fiber-optic cables with low attenuation. For certain high-power applications, semiconductor lasers (or laser diodes) may provide a smaller, lighter, and much more rugged design than certain other lasers. High-power continuous wave (CW) semiconductor lasers, particularly those GaAIAs/GaAs or GaInAsP/InP based edge-emitting lasers and vertical-cavity surface-emitting lasers (VCSELs), are commercially available. Such laser devices may provide power ranging from 50 milliwatts up to 10 watts, and covering a wide wavelength range including those with low absorption windows (e.g., around 1310 and 1550 nanometers). It is contemplated that the optical power transmitter 248 may transmit roughly 100 mW of optical power in some examples.

As mentioned above, the photons emitted from the optical power transmitter 248 in the optical power signal travel over the fiber-optic cable 250 via the optical coupler 252. An optical receiver 256 obtains the photons from the fiber-optic cable 250 through another optical coupler 258. The optical receiver 256 converts the photons of the optical power signal into electric power that can be used to power circuitry of GNSS antenna device 204. Thus, the electricity generated at the optical receiver may be supplied to voltage regulation circuitry 260. For example, the optical receiver 256 may be a photodetector such as a photodiode. Serving as an optical power converter, a photodiode is a semiconductor device that converts light into an electrical current. The current is generated when photons are absorbed in the photodiode. Photodiodes may contain optical filters and built-in lenses. In some cases, a high-power, a large-area (window) photodiode or photodiode array, or a photovoltaic device may be used to acquire more optical power for optical-to-electronic conversion. Commercially available high-efficiency optical power converters are now available from manufacturers such as Broadcom. For example, a Broadcom AFBR-POC406L power converter is specified to be capable of 45-55% conversion efficiency and can provide electrical power of up to 600 milli-watts when illuminated with 1.2 watts optical power (which may be used to provide sufficient or more-than-sufficient electrical power for the disclosed examples here).

The voltage regulation circuitry 260 may include any suitable voltage regulator(s) that can receive the electricity converted from optical energy by the optical receiver 256 and supply a regulated voltage (e.g., 1.5, 3, or 5 V DC voltage) to active circuit elements of the GNSS antenna device 204. In some examples, the voltage regulation circuitry 260 may receive a feedback signal from a power monitor 262 that may monitor a strength of a data signal (e.g., a radiofrequency (RF) signal that will be converted to an optical signal) that will be provided back to the clock circuitry 168 via the optical link 222. The voltage regulation circuitry 260 may use the feedback signal from the power monitor 262 to provide a desired voltage that causes the data signal to have a desired strength (e.g., not to exceed a strength that could damage the clock circuitry 168 or the human eye if a person looked into the optical link 222, strong enough to be detected by the clock circuitry 168). The regulated voltage from the voltage regulation circuitry 260 may be used to power active RF amplification and filtering circuitry 264 and laser bias circuitry 266. In some examples, a portion of the regulated voltage may be stored in an electrical storage device such as a battery or a supercapacitor to be used in case the optical power from the optical link 222 fluctuates for any reason.

The active RF amplification and filtering circuitry 264 may receive a common time signal from an antenna element 268 of the GNSS antenna device 204, which itself may receive the common time signal from one or more satellites of any suitable GNSS, such as the Global Positioning System (GPS), GLONASS, Galileo, BeiDou, QZSS, or IRNSS satellite systems. In certain embodiments, the antenna element 268 may be used with other suitable RF signals from different systems, such as Iridium and other Low-Earth Orbit (LEO) satellite systems, eLoran (a terrestrial-based radio navigation system), WWVB (a terrestrial-based timing system operated by NIST), and cellular systems that offer timing signals. These systems, as well as global navigation satellite systems (GNSS), are referred to herein as "distributed common time sources." In general, discussions in this disclosure relating to GNSS also relate to any such suitable distributed common time sources. Indeed, when GNSS satellites broadcast an accurate and stable time signal from their on-board atomic clocks to Earth, the antenna element 268 may acquire this signal and pass it to the active RF amplification and filtering circuitry 264. The common time signal may be received by the antenna element 268 as a radio frequency (RF) electrical signal. The common time signal may be an analog or digital signal, or some combination of these. The active RF amplification and filtering circuitry 264 may take the RF common time signal from the antenna element 268 and amplify and/or filter the signal using any suitable circuitry, such as a low-noise amplifier (LNA) and/or a surface acoustic wave (SAW) filter that may consume a small amount of power (e.g., about 1 mW, 5 mW, 15 mW, 25 mW). Some additional filtering may be applied by other suitable passive filter elements 270. Although the common time signal as illustrated in FIG. 4 as being in a radio frequency (RF) range, additional circuitry of the GNSS antenna device 204 may convert the RF common time signal into other frequency ranges (e.g., intermediate frequency (IF) ranges) to carry out certain signal processing operations, if desired. In some examples, additional signal decoding and/or encoding circuitry may convert the common time signal into a different data format (e.g., to an analog signal, to a compressed digital or analog signal).

As mentioned above, at this point after being received from the antenna element 268 and amplified by the active RF amplification and filtering circuitry 264, the common time signal is an electrical signal. The common time signal may be converted from the electrical signal into an optical signal via an electro-optic modulated optical signal transmitter 272. The electro-optic modulated optical signal transmitter 272 may be supplied with a bias current by the laser bias circuitry 266. The laser bias circuitry 266 may provide an electrical bias to the optical signal transmitter 272 to establish baseline voltages or currents for the purpose of maintaining proper operating conditions for the optical signal transmitter 272. Indeed, the electro-optic modulated optical signal transmitter 272 may be regulated by a feedback signal from a photodetector 278 that is provided to the laser bias circuitry 266. The photodetector 278 may sample the photons emitted by the electro-optic modulated optical signal transmitter 272 to generate an electrical feedback signal that is proportional to the number of photons detected by the photodetector 278. In this way, the laser bias circuitry 266 may modulate the amount of electricity sent to the electro-optic modulated optical signal transmitter 272 and, thus, maintain a desired bias. Many optoelectronic devices such as laser diodes, transistors and vacuum tubes, whose function is processing time-varying (alternating current (AC)) signals also use a steady (direct current (DC)) bias current or voltage to operate correctly. An additional AC signal applied to them may be superposed on this DC bias current or voltage. In this way, the laser bias circuitry 266 may supply a steady current or voltage to drive the electro-optic modulated optical signal transmitter 272. In some examples, however, the laser bias circuitry 266 may provide an alternating current (AC) bias current or voltage of a particular frequency to cause the electro-optic modulated optical signal transmitter 272 to generate an AC carrier signal (e.g., a baseline electrical signal to generate a baseline optical signal). The common time signal may be applied to modulate the electro-optic modulated optical signal transmitter 272 to generate the optical signal in combination with the carrier signal (whether the carrier signal is AC or DC).

Thus, the laser bias circuitry 266 causes the electro-optic modulated optical signal transmitter 272 to operate in a mode that allows the common time signal in electrical form to modulate the electro-optic modulated optical signal transmitter 272 to generate the optical signal that is provided to the clock circuitry 168. That is, when the common time signal is provided as an electrical signal to the electro-optic modulated optical signal transmitter 272, it has the effect of modulating the optical signal emitted by the electro-optic modulated optical signal transmitter 272. The electro-optic modulated optical signal transmitter 272 may include a low-power, low-noise Fabry-Perot (FP) laser or any other suitable laser devices such as vertical-cavity surface-emitting lasers (VCSELs). Fabry-Perot lasers include a Fabry-Perot cavity in which two highly reflecting mirrors are separated by an amplifying medium with an inverted population which, when stimulated, produces amplified emission (lasing). In many cases, commercially available diode lasers are Fabry-Perot lasers that include Fabry-Perot cavities. A Fabry-Perot cavity is a cavity with two mirrors that bounce light back and forth, forming a standing wave. A Fabry-Perot laser thus may produce a spatially single mode laser output (longitudinally operating at either single-mode (single wavelength) or multimode (multi-wavelength)). The modulation of the common time signal may be implemented by an electro-optic modulator (EOM). An electro-optic modulator is an optical device in which a signal-controlled element exhibiting an electro-optic effect is used to modulate a beam of light (e.g., a laser beam). The modulation may be imposed on the phase, frequency, amplitude, or polarization of the beam. Modulation bandwidths extending into the gigahertz range are possible with the use of laser-controlled modulators. Certain GNSS signals, such as GPS signals, operate in the frequency bands from around 1.2 to 1.6 GHz with bandwidth from 11 to 16 MHz, and therefore may be modulated using a laser-controlled modulator. Additionally or alternatively, the common time signal may be converted to a different frequency band before modulation by the electro-optic modulated optical signal transmitter 272.

The resulting optical signal may be carried by a second fiber-optic cable 274 to the clock circuitry 168 after coupling via an optical coupler 276. Additionally or alternatively, the optical signal from the electro-optic modulated optical signal transmitter 272 may be combined into the same fiber-optic cable 250 that carries the optical power to the antenna. As mentioned previously, each fiber-optic cable (e.g., 274 or 250) may include one or more optical fibers. Splitting the optical link 222 into a power transfer channel (fiber-optic cable 250) and a signal channel (fiber-optic cable 274) may broaden the selection range of the fiber-optic cables. That may be used. For example, depending on the distance, a multimode fiber-optic cable may be used in the power channel to provide more power to the antenna while a single-mode cable may be used in the signal channel to maintain the RF signal quality and accuracy. However, separated channels may increase system complexity, thus may involve more maintenance. Using a single fiber optic cable as the optical link 222 (e.g., effectively merging the fiber-optic cable 274 into cable 250) means combining the power channel and signal channel into a single channel, which thus simplifies the configuration of optical link 222. In this case, however, the challenge is selecting appropriate fiber-optic cables that provides sufficient power to drive the antenna to acquire the GNSS signal while maintaining the signal quality and accuracy during the signal transmission. For example, in some cases, the RF broadband signals may not be transmitted over a multimode cable beyond certain distances.

Indeed, the fiber-optic cables may be multimode, single mode, or other types of fiber-optic cable, depending on the distance between the GNSS antenna tower 206 and the installation 202, as shown in FIG. 3. Multimode fiber-optic cable has a larger diameter core that allows multiple modes of light to propagate. Because of this, the number of light reflections created as the light passes through the core increases, creating the ability for more power to pass through at a given time. Because of the relatively higher dispersion and attenuation rate with this type of fiber, the quality of the signal may be reduced over long distances. Thus, a multimode fiber optical cable may be used when the optical link 222 traverses a relatively shorter distance, while a single-mode fiber-optic cable may be used when the optical link traverses a relatively longer distance. For example, in the optically powered GNSS antenna installation 220 of FIG. 3, a multimode fiber optical cable may be used for a distance less than 1-2 kilometers, while a single mode cable may be used for a distance ranging from 1 kilometer (or less) up to 20 kilometers. Some RF broadband signals may not be transmitted over multimode fiber beyond certain distances. As compared to a multimode cable, a single-mode fiber-optic cable has a smaller diameter core that allows only one mode of light to propagate. Because of this, the number of light reflections created as the light passes through the core decreases, lowering attenuation and creating the ability for the light to travel further. Thus, a single-mode cable may be used when the GNSS antenna device 204 is disposed a longer distance from the clock circuitry 168. It should be noted that there may be challenges for single mode fiber-optic cable to be used for power transmission. For example, coupling high power light into or out of a single mode fiber may be challenging comparing to using a multimode fiber. Additionally, harvesting high power from the single mode fiber may be difficult due to the high power density that may cause saturation or excessive heat on the optical receiver (e.g., receiver 256).

Once the electro-optic modulated optical signal transmitter 272 of the GNSS antenna device 204 has sent the optical signal containing the common time signal over the optical link 222 (e.g., the fiber-optic cable 274), an optical signal receiver 280 may receive the optical signal from the optical link 222 via a coupler 282. The optical signal receiver 280 may convert the optical signal back into an electrical signal. For an RF signal, a low-noise, high-responsivity photodetector or similar device may be used, such as a PIN photo-diode (e.g., InGaAs PIN, GaAs PIN, or Si PIN), an avalanche photodiode (e.g., InGaAs avalanche, GaAs avalanche, or Si avalanche), or other suitable photodetector (e.g., Schottky, GaP, Ge, InAs, InAsSb, or HgCdTe photodiode). For example, a PIN photodiode is a diode with a wide, undoped intrinsic semiconductor region between a p-type semiconductor and an n-type semiconductor region. The p-type and n-type regions may be relatively heavily doped because they are used for ohmic contacts. In contrast to some other p-n diodes, a wide intrinsic region makes a PIN diode suitable for photo-detecting. When a PIN photo-diode is forward-biased, the electric field extends deeply (almost the entire length) into the intrinsic region. This electric field helps in speeding up the transport of charge carriers from the P to the N region, which results in faster operation of the diode, making it a suitable device for high frequency operations (e.g., detecting optical signals carrying RF signals). Bias circuitry 284 may provide a bias to set the PIN photodiode in a proper operating condition for converting the modulated RF signal (optical) into an RF signal (electrical).

The converted RF signal is passed to filtering elements 286 and an RF amplifier 288, and processed by the clock signal decoder 290 before it is received by the clock 292 of the clock circuitry 168. Many GNSS signals appear as a pseudo-random code, which may appear to be background noise but with one valuable difference: the patterns of its fluctuations (waveforms) are known. In this way, the clock signal decoder 290 may decode the optical signal from the GNSS antenna device 204 into the common time signal, which can provide a reference for the clock 292 to perform synchronization.

In the depicted example, the GNSS antenna system 240 may further include various devices to ensure laser light does not undesirably exit the optical link 222. In certain cases, to meet certain regulations, precautions are taken in how the high power laser is driven and connected. First, optical connectors and housings may be provided with mechanical shutters (e.g., Diamond e2000). These are connectors and housings that have mechanical mechanisms that shut when a fiber-optic cable is removed. Second, at start-up, optical pulses may be sent from the optical power transmitter 248 of the clock circuitry 168 to the optical receiver 256 of the GNSS antenna device 204 that are of lower intensity than maximum exposure specifications. These pulses may provide just enough optical power to be converted into electrical energy to drive the data/RF channel optics to establish that the optical link 222 is not broken. Once the clock circuitry 168 receives a signal at the optical signal receiver 280 over the optical link 222 from the electro-optic modulated optical signal transmitter 272 of the GNSS antenna device 204, the clock circuitry 168 may "see" these feedback pulses as indicating that the optical link 222 is not broken. Thereafter, the clock circuitry 168 may drive the optical power transmitter 248 at higher power (e.g., full power) to power the GNSS antenna system 240. Additionally or alternatively, if the clock circuitry 168 does not receive feedback signals in response to providing optical power (e.g., the initial lower-power pulses, later higher-power optical power) from the optical power transmitter 248, this may indicate that the optical link 222 is broken or malfunctioning. In this case, the optical power output of the optical power transmitter 248 may be shut down (e.g., an automatic shutdown). This could be useful in case a person were to attempt to look at the cable end accidentally.

Additionally or alternatively, the power monitor 262 may serve as a real-time power monitor that, in response to detecting that no optical power is being received at the optical receiver 256, may cut power to electro-optic modulated optical signal transmitter 272 and/or may cause the electro-optic modulated optical signal transmitter 272 to emit a cut-off signal. The cut-off signal may be received by the clock circuitry 168 and decoded to cause the optical power transmitter 248 to be shut down.

The systems and methods described herein have been tested against a GNSS satellite clock system that used a coaxial link. The results showed that the optical fiber link outperformed a coaxial (LMR-400) link at greater than 150 meters (500 feet). Since optical attenuation at 1310 nm in single-mode fiber is around 0.04 dB/100 meters, vs. 17 dB/100 meters for LMR-400, it is believed that an optical link can stretch many kilometers, if desired. Additionally, the cost of single-mode fiber may be less expensive than LMR-400.

Technical effects of the disclosed embodiments include providing a solution for GNSS antenna installations that may involve relatively long cable distances such as at dams, oil sites, etc. Moreover, improved system reliability is achieved by the replacement of coaxial cable because fiber-optic cable may be substantially immune to conducted electromagnetic interference (EMI). Furthermore, the fiber-optic cable can transmit the GNSS signals further at lower loss. For examples, RG-8 coaxial cable may be limited to transmit the GNSS signals within a short distance (e.g., 150 feet), and LMR-400 may be limited to transmit the GNSS signals within a longer distance (e.g., 500 feet). After these distances, the GNSS signals may become too attenuated to be used for reliable operations. In comparison to coaxial cables (such as RG-8 and LMR-400), the fiber-optic cable can extend the distance to several kilometers. In addition to those benefits listed above, for antenna diversity and/or anti-spoofing, multiple antennas with distances up to several kilometers from each other can be deployed much more easily.

This disclosure also encompasses other applications that may use an optical link to power a remotely located signal acquirer (satellite antenna, RF antenna, or optical antenna, etc.) and to transfer the acquired signal back for further processing. In certain applications, when power can be provided at the remote site (e.g., from a battery, photovoltaic cells, inductive coupling, or other parasitic power sources), the power channel (e.g., the fiber-optic cable 250 and/or associated circuitry in the clock circuitry 168 such as the optical power driver 242 and the GNSS antenna device 204 such as the optical receiver 256) may be removed from optical link but the signal channel (e.g., the fiber-optic cable 274 and associated circuitry) may remain to provide long-distance signal transmission.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present invention should, therefore, be determined only by the following claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system for obtaining a common time signal from a distributed common time source for synchronizing intelligent electronic devices (IEDs) of an electric power delivery system, the system comprising:
   an optically powered antenna device configured to receive the common time signal over radio frequency (RF) from the distributed common time source and output the common time signal as a carrier optical signal, wherein the optically powered antenna device comprises:
      an optical receiver configured to convert an optical power signal into electric power;
      an antenna configured to receive a radio frequency (RF) signal and pass the RF signal to RF amplification and filtering circuitry;
      the RF amplification and filtering circuitry configured to receive the RF signal, amplify and filter the RF signal, and provide the amplified and filtered RF signal to an electro-optic modulated optical signal transmitter;
      the electro-optic modulated optical signal transmitter configured to receive the amplified and filtered RF signal and use the electric power from the optical receiver to directly output the amplified and filtered RF signal in the carrier optical signal; and
      laser biasing circuitry configured to apply an electrical bias to the electro-optic modulated optical signal transmitter to cause the electro-optic modulated optical signal transmitter to generate the carrier optical signal on which the amplified and filtered RF signal is modulated according to the common time signal;
   an optical power transmitter configured to provide the optical power signal to power the optically powered antenna device; and
   an optical signal receiver configured to receive the carrier optical signal from the optically powered antenna device to obtain the common time signal.

2. The system of claim 1, comprising a clock configured to synchronize the intelligent electronic device (IED) based at least in part on the common time signal.

3. The system of claim 2, wherein the electro-optic modulated optical power transmitter is configured to:
   provide, during start-up, a lower intensity optical power signal that provides enough optical power to establish that an optical link is not broken but less intensity than maximum exposure specifications; and
   wherein the clock is configured to:

upon receiving feedback from the lower intensity optical power signal indicating that the optical link is not broken, drive the optical power transmitter, at a higher power than used to drive the lower intensity optical power signal, to power the optically powered antenna device.

4. The system of claim 1, comprising an optical link configured to convey:
the optical power signal from the optical power transmitter to the optically powered antenna device; and
the optical signal from the optically powered antenna device to the optical signal receiver.

5. The system of claim 4, wherein the optical link comprises:
a first one or more optical fibers configured to convey the optical power signal; and
a second one or more optical fibers configured to convey the optical signal.

6. The system of claim 5, wherein the first one or more optical fibers comprise one or more multimode optical fibers.

7. The system of claim 5, wherein the second one or more optical fibers comprise one or more single-mode optical fibers.

8. The system of claim 4, wherein the optical link comprises an optical fiber configured to convey both the optical power signal and the optical signal.

9. The system of claim 4, wherein the optical link exceeds 500 feet.

10. The system of claim 1, comprising an intelligent electronic device (IED) configured to use the common time signal from the optical signal receiver to synchronize operations with another TED of the electric power delivery system.

11. The system of claim 1, wherein the RF amplification and filtering circuitry comprises active RF amplification and filtering circuitry that consumes up to 25 milliwatts.

12. An optically powered antenna device comprising:
an optical receiver configured to convert an optical power signal into electric power;
an antenna element configured to receive a radio frequency (RF) signal indicating a common time and pass the RF signal to RF amplification and filtering circuitry;
the RF amplification and filtering circuitry configured to receive the RF signal, amplify and filter the RF signal, and provide the amplified and filtered RF signal to an electro-optic modulated optical signal transmitter;
the electro-optic modulated optical signal transmitter configured to receive the amplified and filtered RF signal and use the electric power from the optical receiver to directly output the amplified and filtered RF signal in a carrier optical signal; and
laser biasing circuitry configured to apply an electrical bias to the electro-optic modulated optical signal transmitter to cause the electro-optic modulated optical signal transmitter to generate the carrier optical signal on which the amplified and filtered RF signal is modulated.

13. The optically powered antenna device of claim 12, wherein the optical receiver comprises a photodiode array.

14. The optically powered antenna device of claim 12, wherein the antenna element is configured to receive the time signal from one or more satellites of a global navigation satellite system (GNSS).

15. The optically powered antenna device of claim 12, wherein the electro-optic modulated optical signal transmitter comprises a Fabry-Perot (FP) laser or a vertical-cavity surface-emitting laser (VCSEL).

16. The optically powered antenna device of claim 12, wherein the electro-optic modulated optical signal transmitter comprises an electro-optic modulator configured to modulate a beam of light from the electro-optic modulated optical signal transmitter to carry the amplified and filtered RF signal to generate the optical signal.

17. The optically powered antenna device of claim 16, wherein the electro-optic modulator is configured to modulate a phase, a frequency, an amplitude, or a polarization, or some combination thereof, of the beam of light based at least in part on the RF signal.

18. The optically powered antenna device of claim 12, comprising optical signal transmitter bias circuitry configured to use the electric power to apply an electrical bias to the optical signal transmitter to cause the electro-optic modulated optical signal transmitter to generate a carrier optical signal on which the amplified and filtered RF signal is modulated to generate the optical signal.

19. Circuitry for obtaining a common time signal for synchronizing intelligent electronic devices (IEDs) of an electric power delivery system, the circuitry comprising:
an optical power transmitter configured to generate an optical power signal to power an optically powered antenna device;
an optical signal receiver configured to detect an optical signal that contains the common time signal from the optically powered antenna device; and
an optically powered antenna device configured to receive the common time signal over radio frequency (RF) from a distributed common time source and output the common time signal as a carrier optical signal, wherein the optically powered antenna device comprises:
an optical power receiver configured to convert the optical power signal into electric power;
an antenna configured to receive a radio frequency (RF) signal and pass the RF signal to RF amplification and filtering circuitry;
the RF amplification and filtering circuitry configured to receive the RF signal, amplify and filter the RF signal, and provide the amplified and filtered RF signal to an electro-optic modulated optical signal transmitter;
the electro-optic modulated optical signal transmitter configured to receive the amplified and filtered RF signal and use the electric power from the optical power receiver to directly output the amplified and filtered RF signal in the carrier optical signal; and
laser biasing circuitry configured to apply an electrical bias to the electro-optic modulated optical signal transmitter to cause the electro-optic modulated optical signal transmitter to generate the carrier optical signal on which the amplified and filtered RF signal is modulated according to the common time signal.

20. The circuitry of claim 19, wherein the optical power transmitter comprises a continuous wave (CW) semiconductor laser.

21. The circuitry of claim 19, wherein the optical power transmitter comprises a laser configured to emit light of a wavelength of between around 1310 and 1550 nanometers.

22. The circuitry of claim 19, wherein the optical signal receiver comprises a PIN diode.

23. The circuitry of claim 19, wherein the optical signal receiver is configured to convert the optical signal to an electrical signal, and wherein the circuitry comprises a signal decoder configured to decode the electrical signal to obtain the common time signal.

* * * * *